Figure 1:
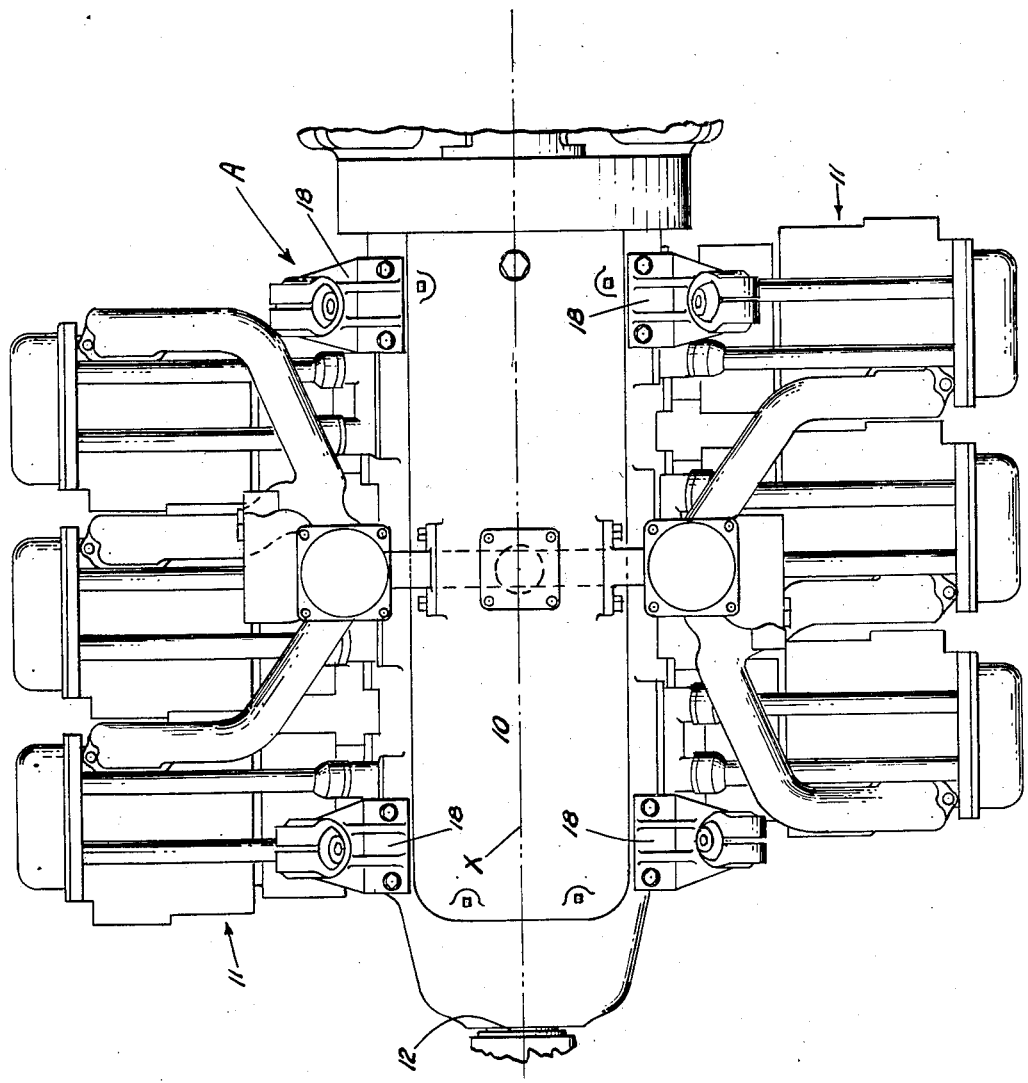

April 26, 1949. T. JACKSON 2,468,671
MOTOR MOUNTING

Filed May 4, 1945 2 Sheets-Sheet 1

INVENTOR.
Thomas Jackson
BY
Attorney

April 26, 1949. T. JACKSON 2,468,671
MOTOR MOUNTING
Filed May 4, 1945 2 Sheets-Sheet 2
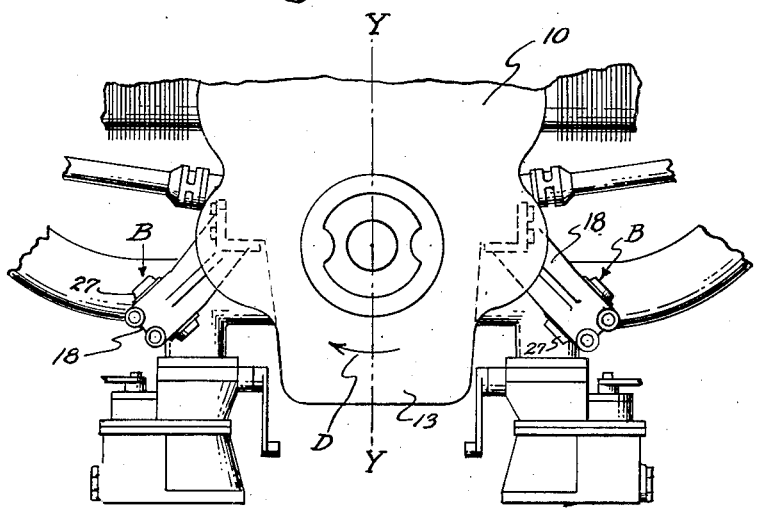
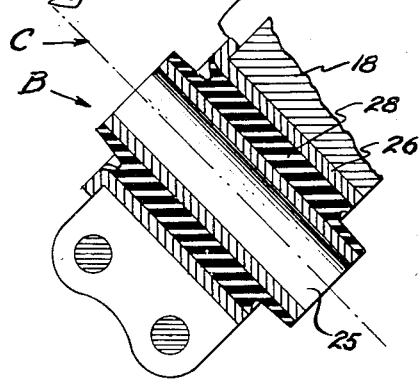
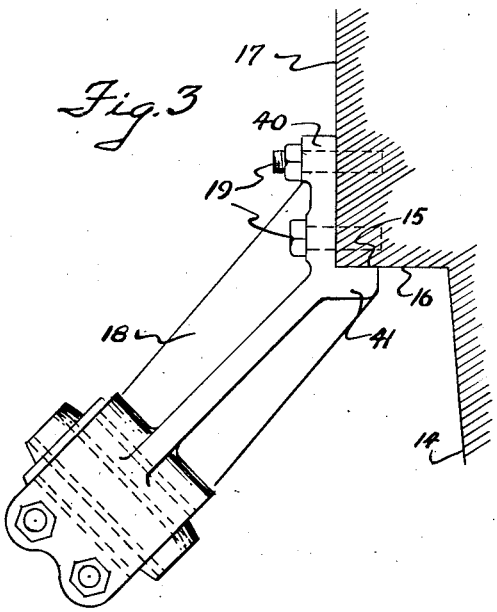
INVENTOR.
Thomas Jackson
BY
G. L. Hauke
Attorney Patented Apr. 26, 1949

2,468,671

UNITED STATES PATENT OFFICE 2,468,671

MOTOR MOUNTING

Thomas Jackson, North Muskegon, Mich., assignor to Continental Motors Corporation, Muskegon, Mich., a corporation of Virginia Application May 4, 1945, Serial No. 591,870

3 Claims. (Cl. 248—7)

My present invention relates to an engine motor mounting and is more particularly directed to the yielding mount itself, consisting of a yielding pivoted fixture carried by a bracket secured to the engine structure and which is adapted for connection with conventional mounting means or brackets carried by the airplane structure.

One particular feature of my present invention is to construct an improved motor mounting device comprising a flanged bushing which is assembled in the mounting device in such a way as to resist the rotating tendency of the engine in operation.

Another feature of the present invention is to provide a novel construction for mounting the bracket supporting said yielding motor mounting device in such a way as to relieve, at least in part, the strains tending to strip the threads of the bolts which secure said bracket to the engine.

For a more detailed understanding of my invention reference may be had to the accompanying drawings illustrating a preferred embodiment of my invention and in which:

Fig. 1 is a bottom plan view of an engine of the opposed cylinder type and showing the motor mounting fixtures secured in place on said engine, Fig. 2 is a fragmentary front elevational view thereof, Fig. 3 is an enlarged fragmentary detail view of the bracket which supports said yielding motor mounting device, and Fig. 4 is an enlarged sectional detail view of the yielding motor mounting device.

It will be obvious that the principles of my invention may be incorporated in various types of engines and I have chosen to illustrate one application thereof, by illustrating the improved motor mounting device as being secured to a multiple cylinder engine of the opposed cylinder type, designated as a whole by reference character A, and which comprises a crankcase 10 to which is secured a plurality of cylinders 11. Said engine is provided with a crankshaft 12 whose axis is represented by the dot and dash line X which lies in the vertical central longitudinal engine plane Y—Y.

The engine crankcase in the present engine is provided with a depending portion 13 which is more particularly constructed to provide an intermediate laterally projecting portion 15 providing a shoulder 16 which is preferably arranged normal to the side wall 17 of said crankcase.

In the present engine construction, I have secured a plurality of brackets 18 to the engine crankcase, preferably by means of studs and bolts 19 which are particularly arranged to attach a flange of the bracket to the side wall of the engine crankcase. It will be noted that in the present assembly I have provided for a plurality of such brackets, two of which are secured to one side of the crankcase and the remaining to the other side of the crankcase, said brackets 18 each particularly supporting a yielding engine mounting device B comprising an inner metal bushing 25 yieldingly carried by a flanged bushing 26 carried by the bracket 18. These bushing supports have axes C which are positioned substantially tangentially relative to a circle with a center lying in said vertical longitudinal central engine plane Y—Y, which plane contains the crankshaft axis X. It will be also noted that these supports are located substantially equidistant from said vertical longitudinal engine plane Y—Y.

In operation, an engine has a tendency to rotate in a direction as indicated by the arrow D. The outer bushing 26 is provided with a flange 27 and is vulcanized onto an intermediate rubber sleeve 28 as is the inner metal bushing 25. These bushings are assembled or carried by the brackets 18 in such a way that the flanges 27 resist the rotating tendencies of the engine and the result is that the rotating tendency of the engine is absorbed in the yielding bushing or engine mounting device B, said rubber sleeve which is vulcanized to both the inner and outer metal bushings 25 and 26 respectively, are thus placed in longitudinal shear.

The bracket 18 is provided with right angle flange portions 40 and 41, the flange 40 lying flush against the side walls 17 of the crankcase and secured by said bolts 19 as described above. The flange 41 is engaged flush against the shoulder 16 and thus resists, at least partially, the tendency of the flange 40 being pulled or pulled away from the wall 17 of the crankcase to which it is secured.

It will be apparent to those skilled in the art to which my invention pertains, that various modifications and changes may be made therein without departing from the spirit of my invention or from the scope of the appended claims.

I claim:

1. Engine mounting devices of the character described for an internal combustion engine comprising a plurality of rigid brackets carried by said engine to support said devices, said devices including yielding bushing supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said vertical longitudinal central engine plane, said bushings each being flanged at one end only and bearing against a rigid bracket secured to said engine, said flanged bushings on one side of said central engine plane reversely assembled with respect to the flanged bushings on the other side of said central engine plane, whereby to resist the tendency of the engine to rotate in one direction about its longitudinal axis.

2. Engine mounting devices of the character described for an internal combustion engine comprising a plurality of rigid brackets carried by said engine to support said devices, said devices including yielding bushing supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said vertical longitudinal central engine plane, said bushings each being flanged at one end only and bearing against a rigid bracket secured to said engine, said flanged bushings on one side of said central engine plane reversely assembled with respect to the flanged bushings on the other side of said central engine plane, whereby to resist the tendency of the engine to rotate in one direction only about its longitudinal axis, said yielding bushing assembly comprising concentric cylindrical metal bushings bonded together by an intermediate rubber bushing vulcanized to both said metal bushings, said rotating tendency of said engine subjecting said rubber bushing to longitudinal shear substantially in one direction.

3. Engine mounting devices of the character described for an internal combustion engine comprising a plurality of rigid brackets carried by said engine to support said devices, said devices including yielding bushing supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said vertical longitudinal central engine plane, said bushings each provided with a flange at one end only, which flange bears against the rigid bracket secured to said engine, said flanged bushings on one side of said central engine plane reversely assembled with respect to the flanged bushings on the other side of said central engine plane, whereby to resist the tendency of the engine to rotate in one direction only about its longitudinal axis, said brackets carrying right angle flanges, one of same underlying a portion of said engine and the other secured to side wall portion of said engine, said underlying flange relieving the securing means which fasten the bracket to the side wall portion from strain.

THOMAS JACKSON.

REFERENCES CITED

The following references are of record in the file of this patent:

UNITED STATES PATENTS

| Number | Name | Date |
|---|---|---|
| 1,991,579 | Sampson | Feb. 19, 1935 |
| 2,185,375 | Janca | Jan. 2, 1940 |
| 2,327,062 | Preston | Aug. 17, 1943 |